United States Patent [19]
Hong

[11] Patent Number: 5,539,421
[45] Date of Patent: Jul. 23, 1996

[54] PLANAR ANTENNA WITH HELICAL ANTENNA ARRAY AND WAVEGUIDE

[75] Inventor: Seong-Hoon Hong, Seoul, Rep. of Korea

[73] Assignee: Daewoo Electronics Co., Ltd., Seoul, Rep. of Korea

[21] Appl. No.: 284,027

[22] Filed: Aug. 1, 1994

[30] Foreign Application Priority Data

Jul. 31, 1993 [KR] Rep. of Korea ............... 93-14873

[51] Int. Cl.⁶ ................................................. H01Q 1/36
[52] U.S. Cl. .......................... 343/895; 343/771; 343/778
[58] Field of Search ............................. 343/895, 776, 343/778, 771; H01Q 1/36, 21/24

[56] References Cited

U.S. PATENT DOCUMENTS

| | | | |
|---|---|---|---|
| 3,701,162 | 10/1972 | Seaton | 343/771 |
| 4,618,865 | 10/1986 | Lamensdorf | 343/776 |
| 4,680,591 | 7/1987 | Axford et al. | 343/895 X |
| 4,916,458 | 4/1990 | Goto | 343/771 |

FOREIGN PATENT DOCUMENTS

| | | | |
|---|---|---|---|
| 132945 | 2/1985 | European Pat. Off. | |
| 209156 | 1/1987 | European Pat. Off. | |
| 266925 | 5/1988 | European Pat. Off. | |
| 4360306 | 6/1991 | Japan | |
| 0151703 | 6/1991 | Japan | H01Q 21/24 |
| 4-361406 | 12/1992 | Japan | H01Q 21/24 |
| 2227369 | 6/1990 | United Kingdom | H01Q 21/24 |

*Primary Examiner*—Donald Hajec
*Assistant Examiner*—Tho Phan
*Attorney, Agent, or Firm*—Anderson Kill Olick & Oshinsky

[57] ABSTRACT

There is provided an improved planar antenna, for use in satellite communication, capable of providing higher aperture efficiency, improved circular polarization and increased production tolerability. The antenna comprises a waveguide and an array of M×N helical antenna elements, wherein M and N are integers. The waveguide includes a primary feeder waveguide and a set of M secondary feeding waveguides, wherein each of the M secondary feeding waveguides is provided with N helical antenna elements, each of the secondary feeding waveguides is coupled to the primary feeder waveguide through an aperture so that received signals from N helical antenna elements in each of the second feeding waveguides are combined at the primary feeder waveguide,

2 Claims, 4 Drawing Sheets

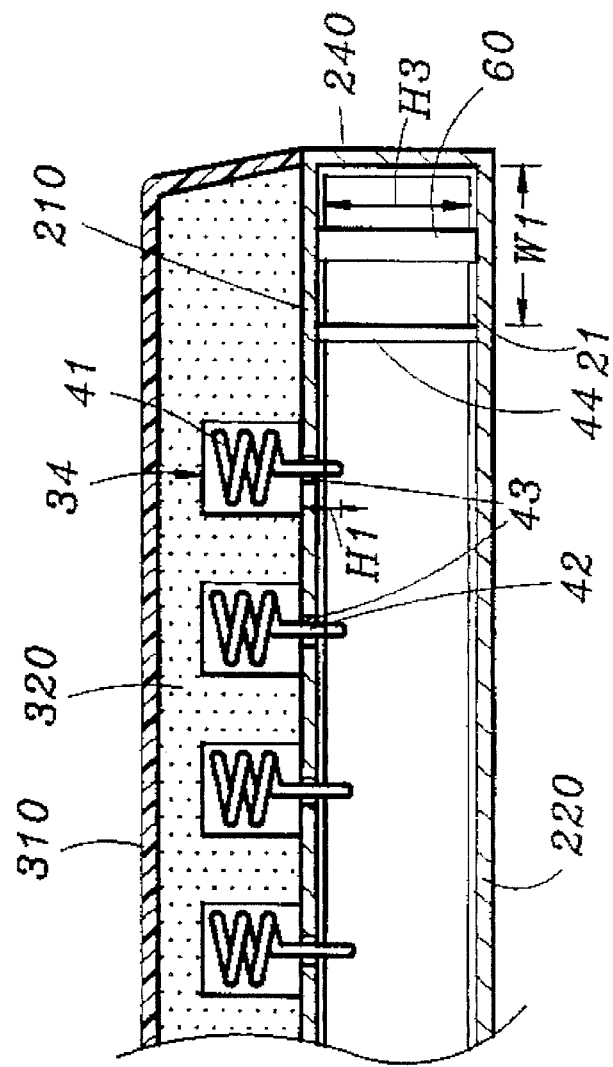
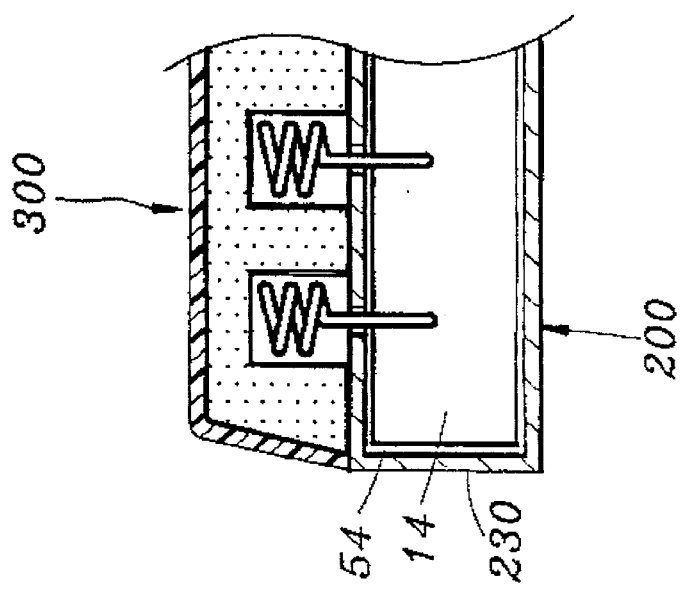
FIG. 2

PLANAR ANTENNA WITH HELICAL ANTENNA ARRAY AND WAVEGUIDE

FIELD OF THE INVENTION

The present invention relates to a planar antenna for the reception of Direct Broadcast Satellite(DBS) television signals; and, more particularly, to an improved planar antenna capable of providing enhanced aperture efficiency, improved circular polarization and increased production tolerability.

BACKGROUND OF THE INVENTION

Reception of direct broadcast signals with around 12 GHz carrier frequency from a satellite requires a circularly polarized antenna with high gain and low axial ratio. Recently, various types of planar antennas have been proposed for DBS reception at this frequency range. The planar antenna is made of an array of antenna elements, each antenna element being capable of receiving 12 GHz signals. Since these antenna elements constituting the array must be able to receive signals of a short wavelength, e.g., in the neighborhood of 2.5 cm, they must be small in size and a large number of such antenna elements is required in order to provide sufficient energy for satisfactory television pictures.

Two of such planar antennas are disclosed in U.S. Pat. Nos. 4,680,591 and 4,907,012, each comprising an array of helical antenna elements with probes located within a common resonant cavity having a square cross section. The cavity is used to combine all the outputs from the elements with a low loss. Specifically, in U.S. Pat. No. 4,907,012, four inwardly-protruding buttresses are provided in the antenna, wherein each buttress is positioned mid-way along a side of the cavity to promote the formation of standing waves of a different mode thereby to improve the frequency range characteristics of the array.

Since, however, these antennas employ resonant cavity to combine the output from the elements by forming standing waves, the antenna elements must be arranged precisely, which will in turn reduce the production tolerability.

SUMMARY OF THE INVENTION

It is, therefore, a primary object of the present invention is to provide an improved planar antenna capable of providing higher aperture efficiency, improved circular polarization and increased production tolerability through the use of waveguides along with an array of helical antenna elements.

In accordance with the present invention, there is provided an antenna for receiving direct broadcasting signals from a satellite, comprising: an antenna waveguide provided with a top, a bottom, a pair of horizontally running sides and a pair of vertically running sides, and said antenna waveguide including a primary feeder waveguide and a set of M secondary feeding waveguides, M being an integer, wherein each of the secondary feeding waveguides has a pair of sides and two ends, the secondary feeding waveguides are placed side by side with each other, one of the outermost secondary feeding waveguides having one of the pair of vertically running sides of said antenna waveguide as one of its sides, each of the secondary feeding waveguides is coupled to the primary feeder waveguide through an aperture located at one end thereof and is bounded at the other end by one of the pair of horizontally running sides of said antenna waveguide, the aperture for each of the secondary feeding waveguides being located at the same end in each of the secondary feeding waveguides and the end bounding each of the secondary feeding waveguides being located at the same end in each of the secondary feeding waveguides thereby restricting the primary feeder waveguide to a portion of said antenna waveguide not occupied by the set of M secondary feeding waveguides; an array of M×N helical antenna elements, N being an integer, each of the helical antenna elements including a helical antenna and a probe joined thereto and extruded into one of the secondary feeding waveguides through the top of said antenna waveguide, wherein each of the M secondary feeding waveguides is provided with N helical antenna elements thereby forming the array of M×N helical antenna elements, each of the helical antennas has a phase difference of 90° with respect to its one or two nearest neighboring helical antennas in the vertical direction and has a phase difference of 180° with respect to its one or two nearest neighboring helical antennas in the horizontal direction, the length of each probe extruded into each of the secondary feeding waveguides increases progressively on a predetermined basis as it moves away from the aperture located at the end thereof and the aperture for each of the secondary feeding waveguides gets progressively narrower on a preset basis as it moves away from the secondary feeding waveguides having one of the pair of vertically running sides of said waveguide as one of its sides; a set of M inductive posts associated with each of the secondary feeding waveguides, each of the inductive posts being coupled to each aperture and located in the primary feeder waveguide; a cover, including a radome and a protective layer, completely enclosing the top surface of said waveguide, including the array of helical antenna elements; and an outputting means coupled with the primary feeder waveguide for outputting signals therefrom.

BRIEF DESCRIPTION OF THE DRAWINGS

The above and other objects and feature of the present invention will become apparent from the following description of preferred embodiments given in conjunction with the accompanying drawings, wherein:

FIG. 2 illustrates a cross-sectional view taken along line A—A shown in FIG. 1, its mid portion being omitted for simplicity;

DETAILED DESCRIPTION OF THE PREFERRED EMBODIMENTS

There is provided an improved planar antenna, comprising a waveguide and an array of M×N helical antenna elements. The waveguide includes a primary feeder waveguide and a set of M secondary feeding waveguides, wherein each of the M secondary feeding waveguides is provided with N helical antenna elements, each of the secondary feeding waveguide is coupled to the primary feeder waveguide through an aperture so that received signals from N helical antenna elements in each of the second feeding waveguides are combined at the primary feeder waveguide.

Figure 1:
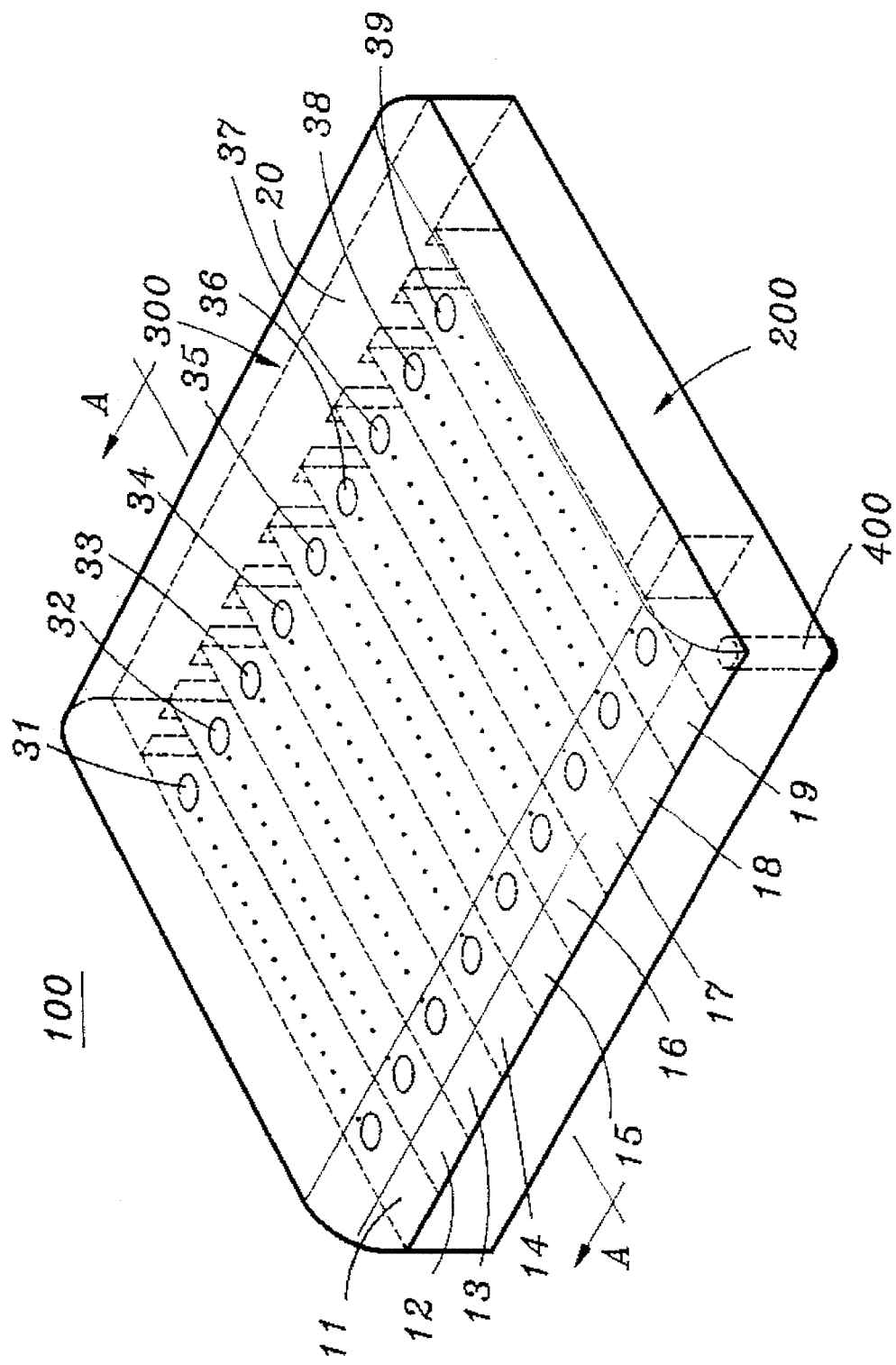
FIG. 1 shows a perspective view of a planar antenna in accordance with the present invention.

In FIG. 1, there is illustrated an antenna module 100 including an antenna waveguide 200, a cover 300 completely enclosing the top surface of the antenna waveguide 200 and an output probe 400.

As a preferred embodiment of the present invention, there is provided an antenna waveguide 200 comprising a primary feeder waveguide 20, 9 secondary feeding waveguides 11 to 19, and 12×9 helical antenna elements, each secondary feeding waveguides having 12 helical antenna elements.

The antenna module 100 is designed to be particularly suited for receiving signals of the format intended for use by the conventional DBS networks such that the antenna module 100 has a plurality of helical antenna elements 31 to 39 for receiving signals with circular polarization and the antenna waveguide 200 designed for transmitting the received signals.

A received signal from the helical antenna elements 31 to 39 is coupled through the antenna waveguide 200 to the output probe 400 through which the received signal is coupled to a receiver (not shown).

Referring to FIG. 2, there is shown a cross-sectional view of the antenna module 100 taken along line A—A shown in FIG. 1. The antenna waveguide 200 is defined by a top plate 210, a bottom plate 220, side walls 230 and 240. Each of the helical antenna elements 34 includes a helical section 41 having, e.g., 2 turns and a probe 42 attached thereto, the probe 42 being located within the secondary feeding waveguide, e.g., 14. The length H1 of each probe 42 extruded into the secondary feeding waveguide 14 increases progressively as the distance between the probe and an aperture 44 located at the right end of the secondary feeding waveguide 14 increases. In this way, there is provided an uniform electric coupling between all of the helical antenna elements 34 and the secondary feeding waveguide 14 such that all the electric field signal components received by the helical antenna elements 34 are uniformly passed into the secondary feeding waveguide 14. The secondary feeding waveguide 14 is defined by an electrically conducting lining 54 made of, e.g., aluminum alloy, copper, gold, nickel, or silver on the internal surfaces of plates 210, 220, and 230 made of an insulating material, e.g., acrylonitrile-butadiene-styrene(ABS) resin and the aperture 44. The height of the secondary feeding waveguide 14 is preferably 9.525 mm.

In order to hold the helical antenna elements 34 securely on the top plate 210 of the secondary feeding waveguide 14, each of the helical antenna element 34, on a neck portion thereof intermediate the helical section 41 and the probe 42, is force-fitted into a plug 43 in the top plate 210 of the second feeding waveguide 14. Although the plug 43 does grip the neck position of the helical antenna element 34 tight enough to prevent its movement during a normal use, the helical antenna element 34 can still be slid in either direction relative to the plug 43 to permit the adjustment of the position of the probe 42 in the secondary feeding waveguide 14.

The secondary feeding waveguide 14 is coupled through the aperture 44 to the primary feeder waveguide 20 shown in FIG. 1, which is defined by an electrically conducting lining 21 (e.g., aluminum alloy, copper, gold, nickel, or silver) on internal surfaces (measuring 19.05 mm in width W1 and 9.525 mm in height H3) of the plates 210, 220 and 240 made of an insulating material, e.g. ABS resin, and the aperture 44. The primary feeder waveguide 20 is used to combine all the outputs from the secondary feeding waveguides 11 to 19. The primary feeder waveguide 20 also includes an inductive post 60 extending from the bottom plate 220 to the top plate 210. The inductive post 60 serves to provide an impedance matching between the primary feeder waveguide 20 and the secondary feeding waveguide 14 to thereby effectively reduce a reflecting radiation energy at their coupling portion.

The helical antenna elements 34 are encompassed in the cover 300 which includes a radome 310 and a polystyrene foam layer 320. The polystyrene foam layer 320 encloses the helical antenna elements 34 in order to provide support and to minimize the risk of damage. The polystyrene foam layer 320 is a material of very low dielectric constant and low radio frequency loss so that its presence has an insignificant effect on the signal reception performance of the antenna. The radome 310 is made of water-repellant plastic material, e.g., ABS resin, to prevent water absorption.

Figure 3:
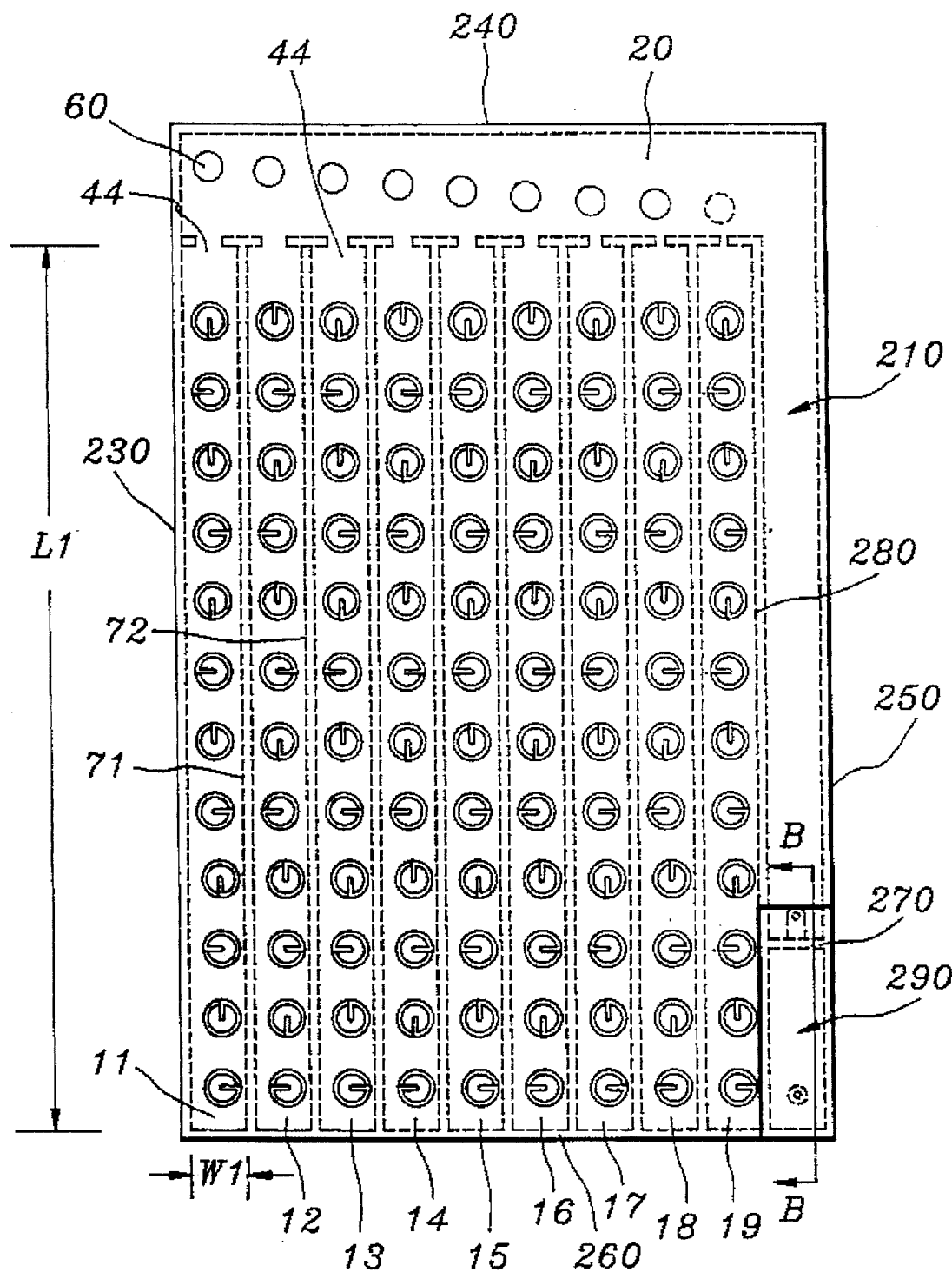
FIG. 3 represents a plan view of the antenna shown in FIG. 1 showing the structure of the antenna waveguide and helical antenna elements.

Referring to FIG. 3, there is shown a plan view of the antenna module 100 with the cover 300 being removed. The waveguide 200 is provided with the bottom plate 220, as shown in FIG. 2, the top plate 210, and four side plates 230, 240, 250 and 260, consisting of a pair of horizontally running side plates 240 and 260, and a pair of vertically running side plates 230 and 250. The antenna waveguide 200 has, when cut parallel to the bottom plate 220, a cross section which is essentially square in shape except for the inwardly protruding output probe section 280 defined by the plates 270 and 280. The antenna waveguide 200 includes the primary feeder waveguide 20 and 9 secondary feeding waveguides 11 to 19, each of which has a fixed length L1 and a fixed width W1. Each of the secondary feeding waveguide 12 is defined by a pair of side plates 71, 72, 260 and the aperture 44. The secondary feeding waveguide 11 has the horizontally running side plate 230 of the waveguide 200 as one of its side surface. Each of the secondary feeding waveguides 11 to 19 is coupled to the primary feeder waveguide 20 through the aperture 44.

The secondary feeding waveguides 11 to 19 are provided with the same number of helical antenna elements. Each helical antenna has a phase difference of 90° with respect to its one or two nearest neighboring helical antennas in longitudinal direction and has a phase difference of 180° with respect to its two nearest neighboring helical antennas in the horizontal direction. The aperture 44 for each of the secondary feeding waveguides 11 to 19 gets progressively narrower on a regular basis as it moves away from the side wall 230.

A set of 9 inductive posts 60 is located in the primary feeder waveguide 20. Each of the inductive posts 60 is coupled to its respective aperture. A distance between each inductive post 60 and its corresponding aperture increases with the width of its corresponding aperture, the relationship between the distance and the aperture width being experimentally determined. In this way, there is provided a preferable impedance matching, thereby greatly reducing the reflecting radiation energy at the coupling portion between the primary feeder waveguide 20 and the second feeding waveguides 11 to 19.

As described above, the received radiation signals from the plurality of the helical antenna elements are coupled to each of the secondary feeding waveguides 11 to 19 and outputs from the secondary feeding waveguides 11 to 19 are combined at the primary feeder waveguide 20 through the inductive posts 60.

Figure 4:
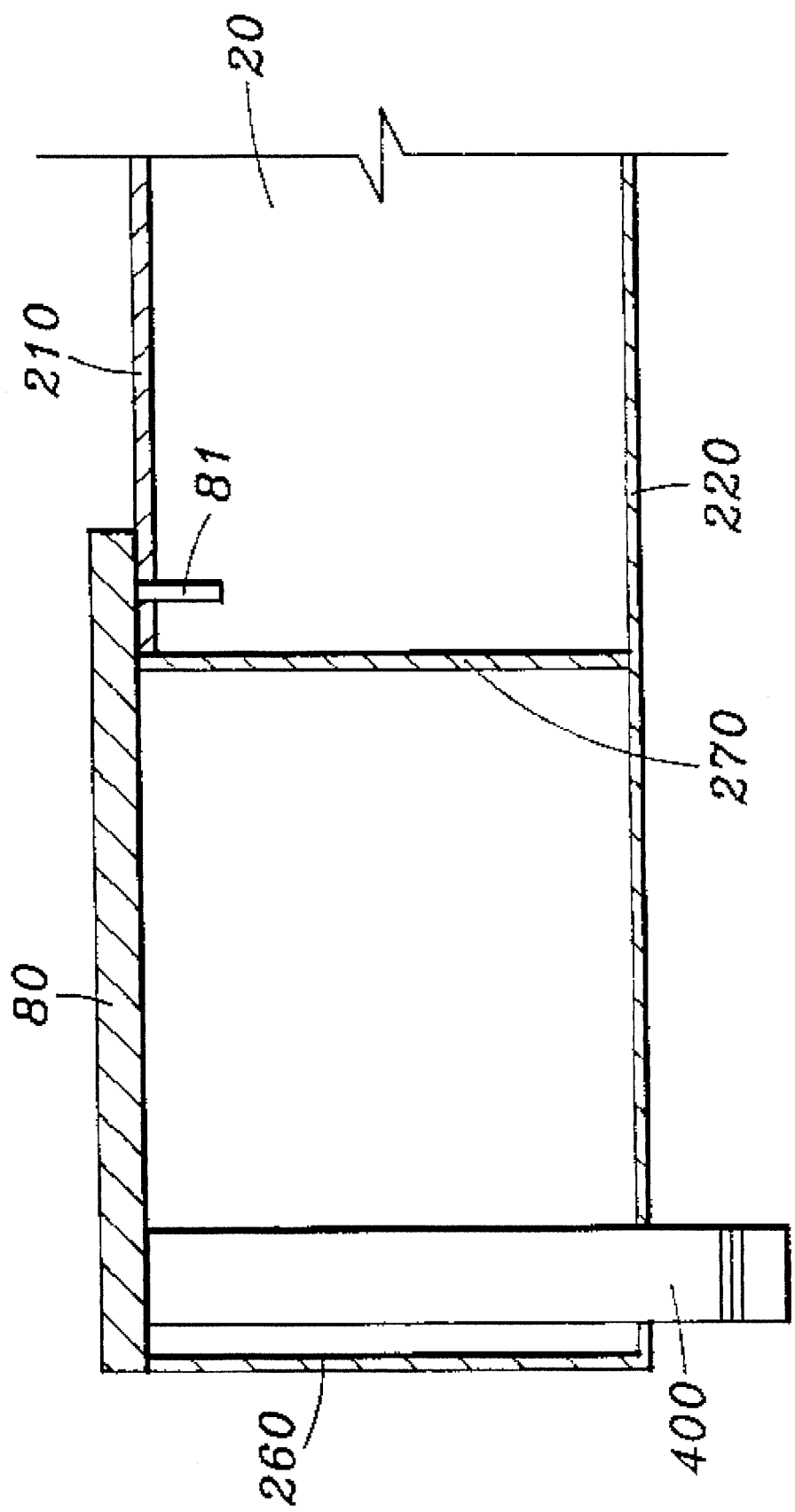
FIG. 4 depicts a partial cross-sectional view taken along line B—B shown in FIG. 3.

Referring to FIG. 4, there is shown a cross-sectional view of the antenna module 100 taken along a line B—B shown in FIG. 3. A conventional low noise breakdown converter (LNB) circuit 80, which is capable of converting high frequency signals to lower frequency signals, is located on the end portion of the top plate 210 and supported by the side plate 240 and a stop wall 270. The output probe 400 for outputting combined signals from the primary feeder waveguide 20 is directly coupled to the LNB circuit 80 and extended downwardly through the bottom plate 220 for the connection to a receiver. The input probe 81 of the LNB circuit 80 is located in the primary feeder waveguide through the top plate 210. In this way, the combined signals from the primary waveguide is coupled through the LNB circuit 80 to the output probe 400 of the antenna in order to pass received signals to the television receiver with the correct phase relationships.

While the present invention has been described with respect to certain preferred embodiment only, other modification and variations may be without departing from the scope of the present invention as set forth in the following claims.

What is claimed is:

1. An antenna for receiving direct broadcasting signals from a satellite, comprising:

an antenna waveguide provided with a top, a bottom, a pair of horizontally running sides and a pair of vertically running sides, and said antenna waveguide including a primary feeder waveguide and a set of M secondary feeding waveguides wherein each of the secondary feeding waveguides has a pair of sides and two ends, the secondary feeding waveguides are placed side by side with each other, one of the outermost secondary feeding waveguides having one of the pair of vertically running sides of the waveguide as one of its side, each of the secondary feeding waveguide is coupled to the primary feeder waveguide through an aperture located at one end thereof and is bounded at the other end by one of the pair of horizontally running sides of said antenna waveguide, the aperture for each of secondary feeding waveguides being located at the same end in each of the secondary feeding waveguides and the end bounding each of the secondary feeding waveguides being located at the same end in each of the secondary feeding waveguides thereby restricting the primary feeder waveguide to a portion of said antenna waveguide not occupied by the set of M secondary feeding waveguides;

an array of M×N helical antenna elements, each of the helical antenna elements including a helical antenna and a probe joined thereto and extruded into one of the secondary feeding waveguides through the top of the antenna waveguide, wherein each of the M secondary feeding waveguides is provided with N helical antenna elements thereby forming said array of M×N helical antenna elements and each of the helical antenna elements has a phase difference of 90° with respect to its one or two nearest neighboring helical antennas in the vertical direction and has a phase difference of 180° with respect to its one or two nearest neighboring helical antennas in the horizontal direction;

a set of M reflection posts associated with each of the secondary feeding waveguides, each of the reflection posts being coupled to each aperture and located in the primary feeder waveguide wherein the length of each probe extruded into each of the secondary feeding waveguides increases progressively on a predetermined basis as it moves away from the aperture located at the end thereof and the aperture for each of the secondary feeding waveguides gets progressively narrower on a preset basis as it moves away from the secondary feeding waveguides having one of the pair of vertically running sides of said waveguide as one of its sides; and outputting means coupled with the primary feeder waveguide for outputting signals therefrom.

2. The antenna according to claim 1, further comprising a cover, including a radome and a protective layer, completely enclosing the top surface of said waveguide the array of helical antenna elements.

\* \* \* \* \*